(12) United States Patent
Chen et al.

(10) Patent No.: US 6,288,167 B1
(45) Date of Patent: Sep. 11, 2001

(54) POLYMER BLENDS WITH IMPROVED COLORABILITY

(75) Inventors: Chuan-Ju Chen, Amherst; Fred Ming-sheng Peng, *deceased*, late of Longmeadow, both of MA (US), by Lily Peng, executrix

(73) Assignee: Bayer Antwerpen S.A./N.V., Antwerp (BE)

( * ) Notice: Subject to any disclaimer, the term of this patent is extended or adjusted under 35 U.S.C. 154(b) by 0 days.

(21) Appl. No.: 09/320,026

(22) Filed: May 26, 1999

Related U.S. Application Data

(63) Continuation-in-part of application No. 08/894,219, filed on Jul. 28, 1997, now abandoned, and a continuation of application No. PCT/US95/01384, filed on Feb. 6, 1997.

(51) Int. Cl.[7] .................................................. C08G 63/48
(52) U.S. Cl. ................................. 525/71; 525/84; 525/85; 525/902
(58) Field of Search .................................. 525/71, 84, 85, 525/902

(56) References Cited

U.S. PATENT DOCUMENTS 4,897,449 * 1/1990 Gaillard et al. ......................... 525/85

* cited by examiner

*Primary Examiner*—Edward J. Cain
(74) *Attorney, Agent, or Firm*—Joseph C. Gil; Aron Preis

(57) ABSTRACT

The present invention is directed to blends of two grafted rubber substrates and a matrix polymer wherein one of the grafted rubber substrates uses a core/shell rubber such as a styrene/butyl acrylate rubber in order to obtain a lower contrast ratio in the blends and better colorability as well as good impact strength.

10 Claims, No Drawings

POLYMER BLENDS WITH IMPROVED COLORABILITY

This application is a Continuation-In-Part of U.S. Ser. No. 08/894,219, filed Jul. 28, 1997, now abandoned, and a continuation of PCT/US95/01384 filed Feb. 6, 1997.

BACKGROUND OF THE INVENTION

1. Field of the Invention

This invention relates to blends of grafted polyacrylate rubber with other polymers. More specifically it relates to blends of (1) a first grafted rubber polymer wherein the rubber has a core/shell structure where the core is a styrenic polymer and the shell is an acrylate rubber; (2) a second grafted rubber polymer wherein the rubber is selected from the group consisting of diene, ethylene propylene and acrylate rubbers; and (3) a matrix polymer formed from a vinyl aromatic monomer, an unsaturated nitrile monomer and optionally one or more compatible comonomers.

2. Description of Related Art

Polymer blends of grafted rubbers are well known in the prior art. These blends are especially useful as molding and extrusion compositions for indoor and outdoor applications. The blends have good impact and weatherability properties. Blends of various polymers using one or more core/shell type polymers are also known. They are taught in the following patent publications.

EPO Patent Publication 0 534 212 A1 (BASF) teaches a mixture of (1) a graft copolymer having a core of a 50–99.9% by weight of a vinylaromatic monomer with a polyfunctional crosslinker and/or a comonomer with two or more functional groups; and (2) a graft polymer having a rubbery core and a shell having a Tg<25° C.

EPO Patent Publication 0 342 283 (Rohm & Haas) teaches either thermoplastic or thermoset matrix polymers and substantially spherical polymer particles having an average diameter of from 2 to 15 micrometers.

U.S. Pat. No. 4,916,171 to Brown et al teaches core/shell polymers having an alkali-insoluble, emulsion polymer core and an alkali soluble, emulsion polymer shell attached or associated with said core so that upon dissolving said shell with alkali, a portion of said shell remains attached or associated with said core. Also taught are compositions wherein said shell polymer has been neutralized and substantially, but not totally, dissolved so as to form a blend of neutralized core-shell polymer and an aqueous solution of neutralized shell polymer.

U.S. Pat. No. 5,047,474 to Rabinovich et al teaches modifier compositions of acrylic core/shell polymers and alkyl methacrylate-butadiene-styrene core/shell polymers are added to polyvinyl halides to provide materials with improved color depth and impact strength, as well as reduced pearlescence.

U.S. Pat. No. 5,237,004 to Wu et al teaches polymer particles in a size range between 2 and 15 micrometers, and having a refractive index close to, but not identical with, that of a matrix polymer and optionally having one or more enclosing shells, the outer shell being compatible with the matrix polymer, impart light-diffusing properties to the matrix polymer without degrading its physical properties, while the particles having a closer refractive index match to the matrix polymer impart gloss reduction to the surface of the matrix polymer.

U.S. Pat. No. 5,266,610 to Malhotra et al teaches the use of core/shell particulate toughening agents in a composite resin system comprised of thermoplastic and thermoset resins wherein the phase morphology is cocontinuous.

Japanese Patent Publication 62/236,850 to Takeda Chemical Industry teaches a core/shell type structure where the glass transition temperature of the core is higher than that of the shell for use in motor vehicles. The blends of grafted rubbers of the prior art are maybe useful. However they may be difficult to color and lack the balance of properties provided by the blends of the present invention. For example, in the prior art blends of (1) a polybutylacrylate rubber grafted with styrene and acrylonitrile (ASA); and (2) a butadiene rubber grafted with styrene and acrylonitrile (ABS), the polybutylacrylate (PBA) used in the ASA component has a lower refractive index (RI) than the polybutadiene (PBD) used in the ABS which has a lower RI than SAN which is grafted onto the polybutylacrylate and polybutadiene and which is also present in the blends as a free matrix polymer. Thus, the difference in RI between the ASA component and the ABS component causes the ASA/ABS blends to be opaque and more difficult to color than ABS alone.

SUMMARY OF THE INVENTION

The present invention is directed to polymer blends comprising:

(1) from 30 to 50% by weight based on the total weight of the polymer blend of a first grafted rubber component comprising an acrylate rubber which is grafted with a vinyl aromatic monomer and an unsaturated nitrile monomer and wherein the acrylate rubber is a core/shell rubber comprising a core prepared from a vinyl aromatic monomer and one or more optional comonomers and an acrylate rubber shell wherein the average rubber phase particle size (RPPS) of the core/shell rubber is in the range of from 0.08 to 0.5 microns;

(2) from 15 to 30% by weight based on the total weight of the polymer blend of a second grafted rubber component comprising a rubber substrate selected from the group consisting of diene, ethylene propylene and acrylate rubbers which is grafted with a vinyl aromatic rubber and an unsaturated nitrile monomer wherein the average rubber phase particle size of the rubber substrate is in the range of from 0.3 to 8 microns; and (3) from 20 to 55% by weight based on the total weight of the polymer blend of a matrix polymer formed from a vinyl aromatic monomer, an unsaturated nitrile monomer and optionally one or more compatible comonomers.

DESCRIPTION OF THE INVENTION

In order to improve the colorability of the prior art polymer blends of ASA and ABS, it is necessary to reduce the RI difference between the two phases in order to reduce the contrast ratio (CR) of the blends. One of the methods used to reduce the RI difference is to increase the rubber phase RI to bring it closer to that of the matrix phase. This can be done to the ASA component by preparing a styrene butyl acrylate (SBA) copolymer to be used as the rubber substrate as styrene has a high RI. However, this SBA copolymer has a high glass transition temperature (Tg) that results in loss of low temperature impact.

A better approach that does not affect the rubber phase Tg and preserves low temperature impact is accomplished in the present invention by making a polystyrene core with a polybutylacrylate shell and then grafting this core/shell substrate with SAN.

The core/shell ASA polymer is then blended with a second grafted rubber such as a polyacrylonitrile-butadienestyrene graft polymer (ABS) and/or a polystyrene-acrylonitrile polymer (SAN) to provide a new molding composition which has better colorability properties, e.g., ease of coloring, increased blackness and/or brightness. In these new compositions less pigment is required to obtain the desired color which results in a cost saving.

A. The Second Grafted Rubber Component

The second grafted rubber component which is blended with the core/shell grafted rubber component are conventional graft polymers which are well known in the art. These are prepared by conventional methods wherein a rubber substrate is grafted with the vinyl aromatic and unsaturated nitrile monomers and optionally one or more additional comonomers. The rubber substrate may be a diene rubber homopolymer or copolymer, an olefin based rubber such as an ethyl propylene (EP) rubber with or without an additional diene monomer (EPDM) and acrylate rubbers. The preferred vinyl aromatic monomers are styrene, alpha methyl styrene and the like. The preferred unsaturated nitrile monomers are acrylonitrile and methacrylonitrile.

One of the preferred second grafted rubber components is poly(acrylonitrile-butadiene-styrene) commonly known as ABS.

The preferred acrylonitrile-butadiene-styrene (ABS) polymer contains from 5 to 30% by weight of a diene rubber based on the total weight of the ABS polymer. The graft and matrix phases of the ABS polymer contain from 5 to 40% by weight of acrylonitrile and from 95 to 60% by weight of styrene based on the total weight of the acrylonitrile and styrene components. The expression ABS is used in the generic sense and includes the known equivalents for acrylonitrile (e.g., methacrylonitrile), butadiene (e.g., copolymer of butadiene, isoprene, chloroprene, etc.) and styrene (e.g., alpha-methyl styrene, halostyrene, etc.). The graft and matrix portions of the ABS polymer may optionally contain up to 40% by weight based on the total weight of the ABS polymer of an additional monomer such as acrylate or methacrylate.

The second grafted rubber component of the present invention is prepared by any of the methods which are well known to those skilled in the art. These second grafted rubber components are preferably prepared by polymerizing the styrene and acrylonitrile monomers in the presence of the rubber by emulsion, suspension, bulk or mass polymerization methods. In particular, a preformed rubber substrate is dissolved in at least a portion of the monomers (with or without a solvent), which form the graft and free matrix components and then the solution is polymerized so that at least a portion of the monomers are combined chemically or grafted onto the rubber substrate and a portion form ungrafted matrix. Depending upon the ratio of monomers to rubber substrate and polymerization conditions, it is possible to produce the desired average rubber phase particle sizes (RPPS); the desired degree of grafting of the monomers onto the rubber substrate; the desired amount of occlusions and, at the same time, polymerization of the monomers to form the ungrafted copolymer matrix.

The amount of rubber used in the second grafted rubber component is in the range of 10 to 40% by weight, preferably 10 to 25% by weight based on the total weight of the grafted rubber component. The particles size of the rubber used in the second grafted rubber component is in the range of 0.3 to 8 microns, preferably 0.3 to two (2) microns.

In the present invention, the average RPPS is determined according to the technique detailed in Hoffman, *An Improved Technique for Particle Size Measurement,* Journal of Colloid and Interface Science, Vol. 143, No. 1 (April 1991).

B. The Matrix Polymer Component

A portion of the vinyl aromatic and unsaturated nitrile monomers polymerized in the presence of the rubber substrates used to prepare the first and second grafted rubber components will not be grafted to the rubber substrates but will be present as ungrafted polymer, e.g., polystyrene-acrylonitrile) or SAN when styrene and acrylonitrile are used as the grafting monomers. The amount of ungrafted SAN copolymer may be increased or decreased depending upon the weight ratio of monomers to rubber, the particular monomer formulation, the nature of the rubber, and the conditions of polymerization.

If additional matrix polymer, e.g., SAN is desired it may be prepared separately and added to the blend. Preferably the SAN matrix copolymer is compatible with the grafted rubber components. Preferred matrix copolymers are prepared from vinyl aromatic monomers such as styrene and/or alpha methyl styrene, unsaturated nitrile monomers such as acrylonitrile, methacrylonitrile and optionally one or more comonomers such as methyl methacrylate, maleic anhydride, maleimide such as N-phenyl maleimide, and the like.

Especially preferred SAN matrix copolymers are prepared from styrene and/or alphamethyl styrene and acrylonitrile and/or methacrylonitrile containing 60 to 90% by weight of the styrenic monomer and 40 to 10% by weight of the nitrile monomer.

C. The Core/shell Grafted Rubber Component

The alkyl acrylate rubbers used in the core/shell first grafted rubber component of this invention comprise acrylic polymers or copolymers having a glass transition temperature, Tg, preferably less than 0° C. which can be polymerized by free radical initiated emulsion techniques onto a polystyrene core. Crosslinking of the rubber is desirable in order to retain the size and shape of the rubber during subsequent polymer processing steps. Inclusion of a polyfunctional ethylenically unsaturated monomer during polymerization facilitates crosslinking. Crosslinked rubber is substantially insoluble in organic solvents such as tetrahydrofuran and cyclohexanone at ambient temperatures.

Examples of acrylic rubbers that can be used include the crosslinked polymers of the $C_2$–$C_{10}$ alkyl acrylate and the $C_8$–$C_{22}$ alkyl methacrylate monomers. Preferably the $C_4$–$C_8$ alkyl acrylate used is butyl acrylate. If desired, the alkyl acrylate monomer charge may contain small amounts, i.e., 1 to 20 wt. % of the amount of acrylate monomer, of optional monomers including styrene, acrylonitrile, methacrylonitrile, methyl methacrylate, methacrylic acid, acrylic acid, vinylidene chloride, vinyl toluene acrylate monomer.

In order to crosslink the acrylate monomer from about 0.05 to about 10 wt. %, preferably 0.1 to 5 wt. %, based on the weight of acrylate monomer of at least one crosslinking agent is used during polymerization. For purposes of this invention, such crosslinking agent should be a di- or polyfunctional ethylenically unsaturated monomer having at least one vinyl group of the formula: $H_2C\!=\!CR\!-\!$ wherein R is hydrogen or lower alkyl. As is well known in the art the vinyl groups on the crosslinking monomer can be the same (e.g., divinyl benzene, trimethylol propane triacrylate, etc.) or different, (e.g., allyl methacrylate, diallyl fumarate, diallyl maleate, etc.) Examples of other suitable crosslinking agents are known to persons in the art.

The average rubber phase particle size (RPPS) of the core/shell rubber is in the range of 0.08 to 0.5 microns, preferably 0.1 to 0.3 microns. The preferred core/shell ratio is in the range of 10/90 to 40/60 by weight based on the total weight of the core/shell polymer prior to grafting.

D. Preparation of the Core/Shell Rubber

Core/shell polymers are well known in the art. Examples of core/shell polymers having multiple layers is taught by P. A. Lovell et al in *Effects of Multiple-Phase Toughening Particle Morphology Upon The Properties Of Toughened Poly(Methyl Methacrylate)*, Polymer Material Science Engineering, Vol. 63, page 583 (1990).

The core/shell polystyrene/polybutylacrylate rubber used in the working examples was prepared in a five liter reactor fitted with a condenser, agitator, thermocouple for temperature measurement and ports for nitrogen blanketing and the addition of monomers and other ingredients.

The reactor was charged with 253–262 parts of water per 100 parts of rubber (pphr) and one part of a 10% solution of Calfax DB45 (dodecyl diphenyloxide disulfonate or DPOS) and then the reactor was purged with nitrogen for five minutes and then heated to 70° C.

The initiator used was a 2.5% solution of potassium persulfate ($K_2S_2O_8$). An initial amount of initiator was charged to the reactor five minutes after the continuous monomer charge I started and late additions of initiator were added at 120 and 220 minutes.

The aqueous soap solution of 10% by weight DPOS and 5% by weight sodium bicarbamate was continuously added during polymerization.

The formulations are tabulated in Tables I and II below. The abbreviations used in these tables are:

| | |
|---|---|
| AN | acrylonitrile |
| BA | butyl acrylate |
| DAM | diallyl maleate |
| DPOS | dodecyldiphenyloxide disulfonate |
| ST | styrene |
| TR-70 | Aerosol TR-70 |
| t-DM | tertdodecylmercaptam |
| μ | microns |

The invention is further illustrated but is not intended to be limited by the following examples in which all parts and percentages are by weight unless otherwise specified.

TABLE 1

Preparation of Core/shell Rubber Examples

| Charge* | 1a (Control) | 2a (Control) | 3a | 4a | 5a | 61 |
|---|---|---|---|---|---|---|
| H₂O | 262 | 256 | 253 | 256 | 256 | 259 |
| DPOS | 5.0 | 8.3 | 8.3 | 7.14 | 6.25 | 5.56 |
| Monomer I | | | | | | |
| BA | — | 39.68 | — | — | — | — |
| ST | — | 26.46 | 66.14 | 42.52 | 24.80 | 11.02 |
| DAM | — | 0.53 | 0.53 | 0.34 | 0.20 | 0.09 |
| TR-70 | — | 0.175 | — | — | — | — |
| Initiator | 9.0 | 9.0 | 9.0 | 9.0 | — | 9.0 |
| Monomer II | | | | | | |
| BA | 99.2 | 59.52 | 99.2 | 99.2 | 99.2 | 99.2 |
| ST | — | 39.68 | — | — | — | — |
| DAM | 0.8 | 0.8 | 0.8 | 0.8 | 0.8 | 0.8 |
| TR-70 | 0.437 | 0.262 | 0.437 | 0.437 | 0.437 | 0.437 |
| Cont. Soap | 15.12 | 22.0 | 22.0 | 21.60 | 18.90 | 16.80 |
| Cont. NaHCO₃ | 2.00 | 2.21 | 2.21 | 2.21 | 2.21 | 2.21 |
| Late Init. I | 2.4 | 2.4 | 2.4 | 2.4 | 2.4 | 2.4 |
| Late Init. II | — | 1.2 | 1.2 | 1.2 | 1.2 | 1.2 |
| pH | 7.21 | 7.29 | 7.19 | — | — | — |
| Solids | 24.15 | 30.93 | 32.65 | 30.06 | 27.79 | 25.71 |
| RPPS (μ) | 0.14 | 0.14 | 0.15 | 0.15 | 0.14 | 0.14 |

In the above examples, Control Example 1 uses a polybutylacrylate rubber that does not contain a polystyrene core and Control Example 2 uses a polybutylacrylate styrene copolymer rubber that does not have a polystyrene core.

After the preparation of the rubbers shown in Table 1, they were grafted by polymerization of styrene and acrylonitrile in the presence of the rubber. The grafting reaction was carried out sequentially in the same reactor.

The sequential grafting reaction was carried out at 70° C. using a continuous charge of styrene/acrylonitrile (weight ratio=70:30) and a continuous charge of initiator and soap. The graft polymerization reaction was divided into two parts where diallylmaleate (DAM) and tertdodecyl mercaptan (t-DM) were included in the first and the second stage, respectively, as described in Table II below.

TABLE II

Summary of S/AN Grafting Step Examples

| Charge | 1b (control) | 2b (control) | 3b | 4b | 5b | 6b |
|---|---|---|---|---|---|---|
| Cont. Monomer I | | | | | | |
| Styrene | 20.6 | 34.33 | 34.33 | 29.43 | 25.75 | 22.89 |
| AN | 9.0 | 15.0 | 15.0 | 12.86 | 11.25 | 10.0 |
| DAM | 0.40 | 0.67 | 0.67 | 0.57 | 0.50 | 0.44 |
| Cont. Soap | 26.20 | 16.0 | 16.0 | 18.71 | 21.83 | 24.26 |
| Cont. Catalyst | 12.0 | 6.67 | 6.67 | 8.57 | 10.0 | 11.11 |
| Cont. NaHCO₃ | 1.73 | 1.09 | 1.09 | 1.24 | 1.44 | 1.60 |
| Cont. Monomer II | | | | | | |
| Styrene | 83.52 | 23.20 | 23.20 | 44.74 | 60.90 | 73.47 |
| AN | 36.0 | 10.0 | 10.0 | 19.28 | 26.25 | 31.67 |
| t-DM | 0.48 | 0.13 | 0.13 | 0.26 | 0.35 | 0.42 |
| pH | 7.39 | 7.44 | 7.46 | — | — | — |
| Solids | 40.83 | 40.77 | 40.63 | 40.66 | 40.63 | 40.72 |

At the end of the graft polymerization step the graft polymer (including free matrix polymer) was recovered by salt coagulation. The resulting polymer was then tested for IZOD impact, IDI impact and contrast ratio (CR) as described below.

Test Methods Used

Inverted Dart Impact (IDI)—(Joules): A dart with a hemispherical head having a diameter of 0.013 meter is used, against which the specimens is driven at a constant speed of either 2.12 or 3.39 meters/second. This is in accordance with the procedure set forth in ASTM D 3763. The specimen thickness was 2.54 mm, the ring diameter was 31.75 mm, and the test temperature was −30° C. Results are expressed in Joules.

Izod Impact (J/m)—A falling pendulum with 163 Joules of energy at a velocity of 11.5 feet (3.5 meters) per second strikes a fixed specimen; the height of the pendulum swing after striking is a measure of the energy absorbed and thus indicates impact strength. The test was run at 23°

C. and the results are expressed in Joules/meter. This is in accordance with the procedures set forth in ASTM D 256.

Contrast Ratio—A molded specimen of 0.100 inches (2.54 mm) thickness in natural color was measured on an Applied Color System spectrophotometer. The measurement was made with Illuminant D65 at a 10° Observer. The contrast ratio expressed as a percentage is defined as the ratio of the reflectance of a sample over a black background to that of the reflectance of the same sample over a white background.

SAMPLE PREPARATION

In the following examples the grafted rubber components from Table II above, the SAN and ABS polymers are melt compounded using a Banbury Mixer followed by pelletizing. The resulting pellets are then molded and tested as indicated below.

The total rubber content including butadiene rubber in all the formulations was 18%. The separately prepared SAN contains 68% by weight of alphamethyl styrene matrix (AMS) and 32% by weight of acrylonitrile. The ABS used was a conventional ABS which had a polybutadiene rubber substrate having an average RPPS size of 0.7 to 0.9. The substrate was grafted with styrene and acrylonitrile (weight ratio of S/AN=75.5/24.5). All formulations contain conventional additives including UV stabilizers, antioxidant, and plasticizer.

TABLE III

Properties of the Polyblends Examples

| Composition | 1c (Control) | 2c (Control) | 3c | 4c | 5c | 6c |
|---|---|---|---|---|---|---|
| ASA | 37.8 | 37.8 | 37.8 | 37.8 | 37.8 | 37.8 |
| Styrene Core | 0 | * | 40 | 30 | 20 | 10 |
| BA shell | 100 | * | 60 | 70 | 80 | 90 |
| ABS | 25.0 | 25.0 | 25.0 | 25.0 | 25.0 | 25.0 |
| AMS-AN | 37.2 | 37.2 | 37.2 | 37.2 | 37.2 | 37.2 |
| IZOD (23° C.) | 154 | 101 | 91 | 116 | 147 | 149 |
| IDI (−30° C.) | 3.5 | 0.2 | 3.1 | 3.3 | 6.3 | 3.4 |
| Contrast Ratio | 94 | 81 | 78 | 82 | 84 | 88 |

*The ASA used in Example 2 was a copolymer of 40% by weight of styrene and 60% by weight of butyl acrylate having the same overall composition as the core/shell ASA in Example 3.

Referring to Examples 1c to 6c in Table III, the Izod impact is lower (compared to Example 1c) when using a butyl acrylate-styrene copolymer rubber without a core (Example 2c) and a polystyrene core which is about 40% and 30% by weight of the core/shell polymer (Example 3c and 4c respectfully). However, when using a polystyrene core that is less than 30% by weight (Examples 5c and 6c), the Izod impact approaches that of polybutylacrylate (Example 1c).

In the case of IDI, the impact decreases sharply for the butylacrylate-styrene copolymer rubber without a core (Example 2c). However, when using a polystyrene core (Examples 3c to 6c), the IDI is equivalent to that of polybutylacrylate (Example 1c).

In the case of the Contrast Ratio, the CR values fall below 80 when using a polystyrene core which is 40% by weight (Example 2c). However, the CR values begin to decrease when the styrene core weight percent increases from 30% to 10% (Examples 4c to 6c) based on the weight of the core/shell rubber. It should be noted that the higher the CR the more opaque is the material and the more difficult it is to color. Example 1c with a CR level of 94 is very opaque.

The CR is lowered in Example 2c, but the impact properties suffer. Preferably the CR is less than 90, more preferably less than 85 for better colorability.

In the present invention, the core/shell styrene/butylacrylate rubber has a polystyrene core which is from 5% to 40% of the weight of the core/shell rubber. Preferably, the polystyrene core is 10% to 35% and more preferably 10% to 30% of the weight of the core/shell rubber in order to obtain the desired balance of impact and contrast ratio.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer blend comprising:
   (1) from 30 to 50% by weight based on the total weight of the polymer blend of a first grafted rubber component comprising an acrylate rubber which is grafted with a vinyl aromatic monomer and an unsaturated nitrile monomer and wherein the acrylate rubber is a core/shell rubber comprising a core prepared from a vinyl aromatic monomer and one or more optional comonomers and an acrylate rubber shell wherein the average rubber phase particle size (RPPS) of the core/shell rubber is in the range of from 0.08 to 0.5 microns and wherein the weight of the core is in the range of 5 to 40% by weight of the total weight of the core/shell rubber;
   (2) from 15 to 30% by weight based on the total weight of the polymer blend of a second grafted rubber component comprising a rubber substrate selected from the group consisting of diene, ethylene propylene and acrylate rubbers which rubber is grafted with a vinyl aromatic monomer and an unsaturated nitrile monomer wherein the average rubber phase particle size of the rubber substrate is in the range of from 0.3 to 8 microns; and
   (3) from 20 to 55% by weight based on the total weight of the polymer blend of a matrix polymer formed from a vinyl aromatic monomer, an unsaturated nitrile monomer and optionally one or more compatible comonomers.

2. A polymer blend as in claim 1 wherein the total amount of rubber in the first and second grafted rubber components is in the range of 10 to 30% based on the total weight of the polymer blend.

3. A polymer blend as in claim 2 wherein the weight of the core in the first grafted rubber component is in the range of 10 to 30% by weight based on the total weight of the core/shell rubber.

4. A polymer blend as in claim 3 wherein the average rubber phase particle size of the core/shell rubber is in the range of 0.1 to 0.3 microns.

5. A polymer blend as in claim 1 wherein the rubber used in the second grafted rubber component is poly(acrylonitrile-butadiene-styrene).

6. A polymer blend as in claim 1 wherein the rubber used in the second grafted rubber component is an ethylene-propylene-diene monomer rubber.

7. A polymer blend as in claim 1 wherein the rubber used in the second grafted rubber component is a butylacrylate rubber.

8. A polymer blend comprising:
   (1) from 30 to 50% by weight based on the total weight of the polymer blend of a first grafted rubber component comprising a butyl acrylate rubber which is grafted with styrene and acrylonitrile monomers and wherein the butyl acrylate rubber is a core/shell rubber comprising a core prepared from a styrene monomer and a butyl acrylate rubber shell wherein the average rubber phase particle size (RPPS) of the core/shell rubber is in the range of from 0.1 to 0.3 microns and wherein the weight of the core is in the range of 10 to 30% by weight of the total weight of the core/shell rubber;

(2) from 15 to 30% by weight based on the total weight of the polymer blend of a second grafted rubber component comprising a diene rubber substrate which is grafted with a styrene and acrylonitrile monomer wherein the average rubber phase particle size of the diene rubber substrate is less than 2 microns; and (3) from 20 to 55% by weight based on the total weight of the polymer blend of a matrix polymer formed from styrene and acrylonitrile monomers.

9. A polymer blend as in claim 8 wherein the total amount of rubber in the first and second grafted rubber components is in the range of 10 to 30% based on the total weight of the polymer blend.

10. A core/shell rubber comprising a styrenic polymer core and a butylacrylate shell which is grafted with a vinyl aromatic monomer and an unsaturated nitrile monomer wherein the average rubber phase particle size (RPPS) of the core/shell rubber is in the range of from 0.08 to 0.5 microns and wherein the weight of the core is in the range of 5 to 40% by weight of the styrenic polymer total weight of the core/shell rubber.

* * * * *